US010836371B1

(12) United States Patent
Thiruvengadam et al.

(10) Patent No.: US 10,836,371 B1
(45) Date of Patent: Nov. 17, 2020

(54) BATTERY SAVING CONTROLS ASSOCIATED WITH MOBILE GENERATOR USE OF A VEHICLE

(71) Applicant: Ford Global Technologies, LLC, Dearborn, MI (US)

(72) Inventors: Harish Thiruvengadam, Royal Oak, MI (US); Erik J. Christen, Royal Oak, MI (US); Kevin James Rhodes, Dearborn, MI (US); Chad Bednar, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/599,848

(22) Filed: Oct. 11, 2019

(51) Int. Cl.
*B60W 10/08* (2006.01)
*B60L 58/13* (2019.01)
*B60L 55/00* (2019.01)
*B60W 20/12* (2016.01)

(52) U.S. Cl.
CPC .............. *B60W 10/08* (2013.01); *B60L 55/00* (2019.02); *B60L 58/13* (2019.02); *B60W 20/12* (2016.01)

(58) Field of Classification Search
CPC ................................ B60L 55/00; B60L 58/13

USPC .................................................. 318/139, 34
See application file for complete search history.

(56) References Cited

U.S. PATENT DOCUMENTS

| 8,860,348 B2* | 10/2014 | Savagian ............. B60W 10/26 318/432 |
| 9,539,996 B2 | 1/2017 | Kristinsson et al. |
| 9,919,612 B2 | 3/2018 | Mizuno et al. |

* cited by examiner

*Primary Examiner* — David Luo
(74) *Attorney, Agent, or Firm* — David B. Kelley; Brooks Kushman P.C.

(57) ABSTRACT

A vehicle includes an engine, an electric machine selectively coupled to the engine, a traction battery, an electrical outlet, and first and second power inverters. The first power inverter is configured to transfer power between the traction battery and the electric machine. The second power inverter is configured to transfer power between the traction battery and the electrical outlet. A human-machine interface (HMI) has a selectable option indicative of a user's desire to use the electrical outlet at a next destination. A controller of the vehicle includes a processor and memory having stored therein a first battery state of charge (SOC) target and a second battery SOC target that is greater than the first SOC target. The controller is programmed to, in response to the selectable option being selected, switch from the first SOC target to the second SOC target and command charging of the traction battery responsive to a measured battery SOC being less than the second target.

20 Claims, 5 Drawing Sheets

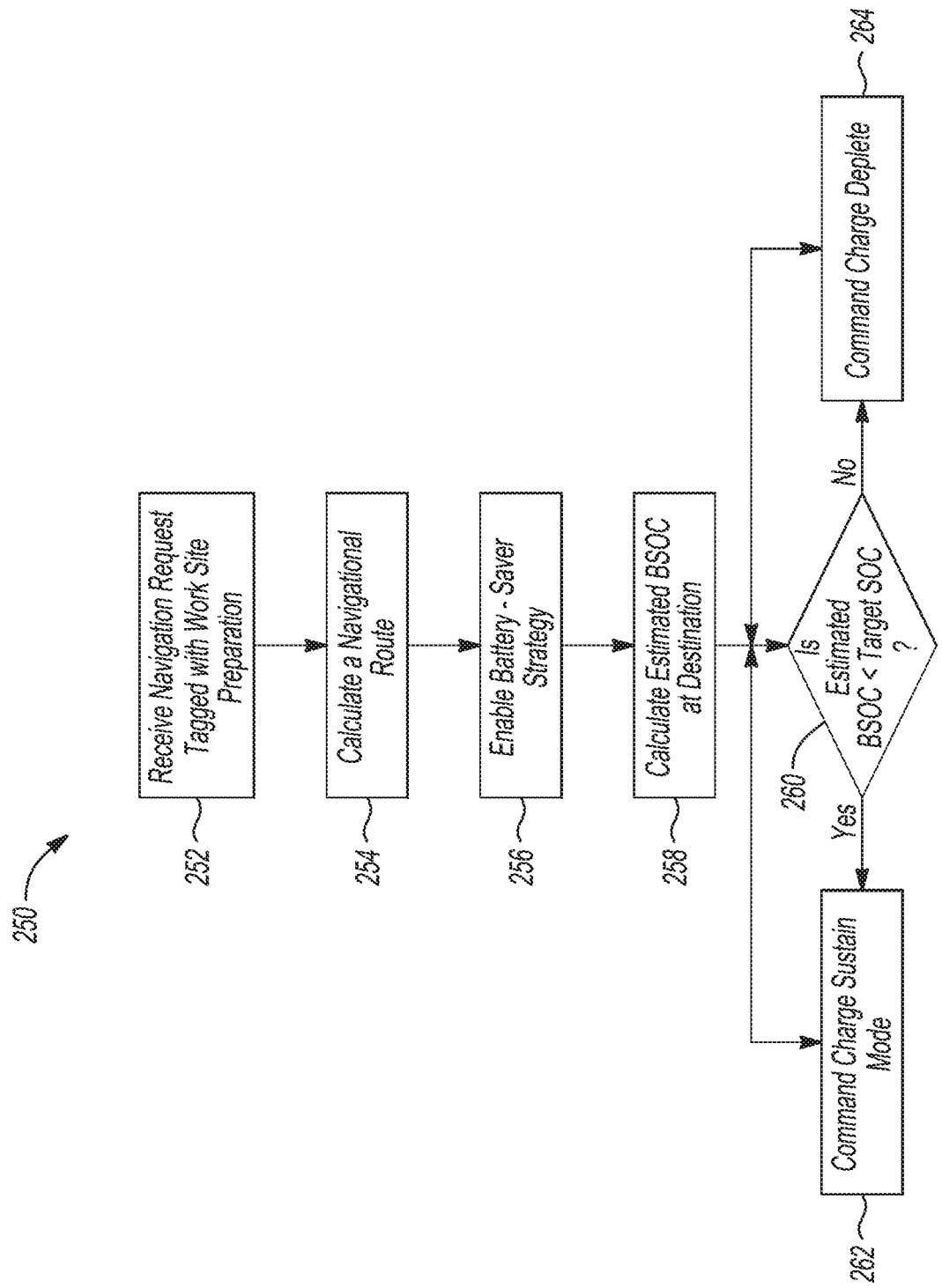

BATTERY SAVING CONTROLS ASSOCIATED WITH MOBILE GENERATOR USE OF A VEHICLE

TECHNICAL FIELD

This disclosure relates to electrified vehicles with capacity to act as mobile generators and more specifically to controls for maintaining battery state of charge during transit so that battery power may be used to power auxiliary loads at a site.

BACKGROUND

An electrified powertrain may include an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes an engine, an electric machine selectively coupled to the engine, a traction battery, an electrical outlet, and first and second power inverters. The first power inverter is configured to transfer power between the traction battery and the electric machine. The second power inverter is configured to transfer power between the traction battery and the electrical outlet. A human-machine interface (HMI) has a selectable option indicative of a user's desire to use the electrical outlet at a next destination. A controller of the vehicle includes a processor and memory having stored therein a first battery state of charge (SOC) target and a second battery SOC target that is greater than the first SOC target. The controller is programmed to, in response to the selectable option being selected, switch from the first SOC target to the second SOC target and command charging of the traction battery responsive to a measured battery SOC being less than the second target.

According to another embodiment, a vehicle includes an engine, an electric machine selectively coupled to the engine, a traction battery, an electrical outlet, and first and second power inverters. The first power inverter is configured to transfer power between the traction battery and the electric machine. The second power inverter is configured to transfer power between the traction battery and the electrical outlet when in a generator mode. The vehicle also includes a navigation system having a human-machine interface (HMI) configured to receive a destination input and a generator-mode input from a user. A vehicle controller including a processor and memory having stored therein a first battery state of charge (SOC) target and a second battery SOC target that is greater than the first SOC target. The controller is programmed to, in response to receiving a destination via the destination input and receiving a request for generator mode via the generator-mode input, switch from the first SOC target to the second SOC target, and, in response to the vehicle having an estimated battery SOC at the destination being less than the second SOC target, charge the battery to the second SOC target.

According to yet another embodiment, a vehicle includes an engine, an electric machine selectively coupled to the engine, a traction battery, an electrical outlet, and first and second power inverters. The first power inverter is configured to transfer power between the traction battery and the electric machine. The second power inverter is configured to transfer power between the traction battery and the electrical outlet when in a generator mode. The vehicle also includes a navigation system having a human-machine interface (HMI) configured to receive a destination input and a generator-mode input from a user. A vehicle controller is programmed to, calculate a navigational route between a current position of the vehicle and the destination and calculate an estimated battery SOC at the destination. The controller is further programmed to, in response to receiving the destination input and the generator-mode input, increase a state of charge (SOC) target for a first SOC target to a second SOC target, and, in response to the estimated battery SOC being less than the second SOC target, command a battery-sustain mode in which the battery is charged and maintained at the second SOC target.

BRIEF DESCRIPTION OF THE DRAWINGS

FIG. 8 is a flow chart of another algorithm for operating the battery during a battery-saver strategy.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
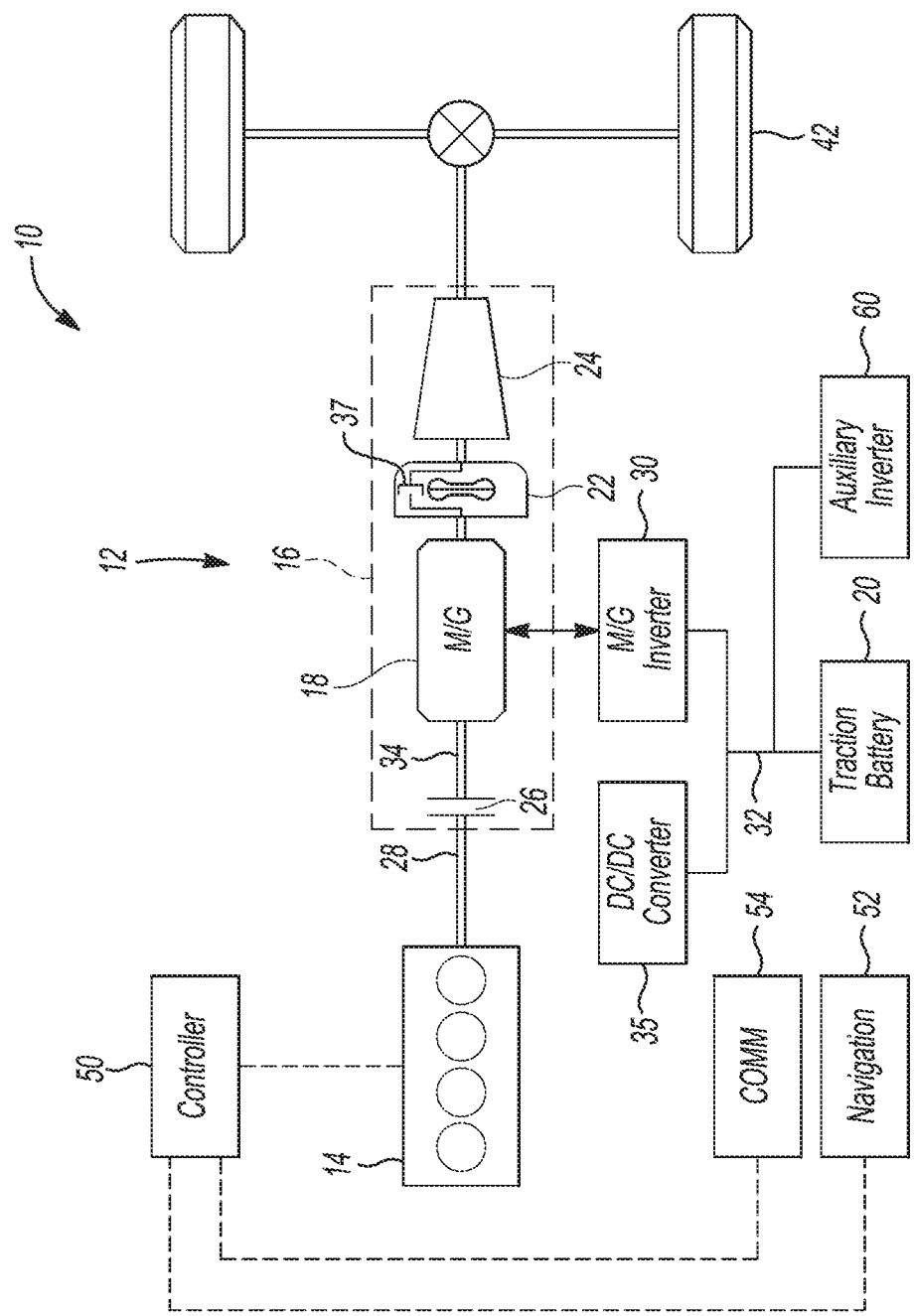
FIG. 1 is a schematic diagram of a hybrid vehicle having an auxiliary power system.

Referring to FIG. 1, a schematic diagram of a hybrid-electric pickup vehicle 10 is illustrated according to an embodiment of the present disclosure. The vehicle may be a pickup truck. The pickup truck 10 includes an auxiliary power system that allows the truck 10 to be used as a mobile generator. FIG. 1 illustrates representative relationships among the components. Physical placement and orientation of the components within the vehicle may vary. The truck 10 includes a powertrain 12. The powertrain 12 may include an engine 14 that drives a transmission 16, which may be referred to as a modular hybrid transmission (MHT). As will be described in further detail below, the transmission 16 may include an electric machine such as an electric motor/generator (M/G) 18, an associated traction battery 20, a torque converter 22, and a multiple step-ratio automatic transmission or gearbox 24. For simplicity, the M/G 18 may be referred to as a motor. The engine 14, M/G 18, torque converter 22, and the gear box 24 may be connected sequentially in series, as illustrated in FIG. 1.

The engine 14 and the M/G 18 are both drive sources for the truck 10 and may be referred to as actuators. The engine 14 generally represents a power source that may include an internal-combustion engine such as a gasoline, diesel, or natural gas engine. The engine 14 generates engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor.

The M/G 18 is powered by a traction battery 20. The traction battery 20 stores energy in a plurality of individual battery cells connected together to provide a desired voltage and charge capacity for the M/G 18. In one embodiment, traction battery 20 includes an array of lithium-ion battery cells. The traction battery 20 typically provides a high-voltage direct current (DC) output to a high-voltage bus 32, although the voltage and current may vary depending on particular operating conditions and loads. The traction battery 20 is electrically connected to an M/G power inverter 30, and a DC/DC converter 35, for example. The power inverter 30 converts DC power from the battery to AC power for use with the electric machines. For example, power electronics may provide three-phase alternating current (AC) to the M/G 18. The power inverter 30 is also capable of acting as a rectifier. The DC/DC converter 35 is configured to convert the high-voltage DC output of the traction battery 20 to a low-voltage DC supply that is compatible with other vehicle loads that may be directly connected thereto. The inverter 30 may include an inductor configured to step-up or step down current and voltage.

One or more contactors may isolate the traction battery 20 from other components when open and connect the traction battery 20 to the other components when closed. The traction battery 20 may include various internal circuits for measuring and monitoring various operating parameters including cell current and individual cell voltage. Parameters such as voltage, current and resistance for a battery cell or a group of battery cells (sometimes referred to an array) may be monitored and/or controlled by a vehicle controller 50.

Vehicle 10 may also include an auxiliary battery having a relatively lower nominal voltage (such as 24V or 48V, for example) and may be implemented using different battery chemistries than the traction battery 20. The auxiliary battery may also be referred to as a low-voltage battery, starter battery or simply the vehicle battery for various applications. The auxiliary battery may be used to power various low-voltage components, controllers, modules, motors, actuators, sensors, etc.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 34 into electrical energy to be stored in the battery 20 or used by vehicle systems such as an auxiliary electrical system. The disconnect clutch 26 can also be disengaged to isolate the engine 14 from the remainder of the powertrain 12 such that the M/G 18 can act as the sole drive source for the truck 10. The M/G 18 is continuously, drivably connected to the shaft 34, whereas the engine 14 is drivably connected to the shaft 34 only when the disconnect clutch 26 is at least partially engaged. When the disconnect clutch 26 is locked (fully engaged), the crankshaft 28 is fixed to the shaft 34.

The vehicle 10 includes an auxiliary power inverter 60 connected to the high-voltage bus 32. The inverter 60 is configured to converter the DC power of the bus 32 to AC power that is compatible with the auxiliary-power system for powering external loads. The inverter 60 is also configured to stepdown the voltage of the bus 32 to voltages compatible with the auxiliary power system such as common wall voltages 120 and/or 240.

It should be understood that the schematic illustrated in FIG. 1 is merely exemplary and is not intended to be limiting. Other series-hybrid configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Further, the truck 10, in other embodiments, may include a parallel-hybrid configured (also known as a split hybrid).

The vehicle 10 includes one or more controller 50 such as a powertrain control unit (PCU), an engine control module (ECM), a motor control unit (MCU), and a DC/AC inverter controller (DCACA). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 50 within each of the subsystems identified above.

An accelerator pedal is used by the driver of the vehicle to provide a demanded torque, power, or drive command to propel the vehicle. The pedal may include a pedal-position sensor. In general, depressing and releasing the pedal causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 37. Like the disconnect clutch 26, the bypass clutch 37 can be modulated across a range between the engaged and disengaged positions. This produces a variable slip in the torque converter 22 in addition to the variable slip produced by the hydrodynamic coupling between the impeller and the turbine. Alternatively, the bypass clutch 37 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 34. This operation mode may be referred to as "hybrid mode," "engine-motor mode," or "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 34. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The controller 50 includes programming for managing the SOC of the battery 20. Generally, one or more battery SOC thresholds and/or targets are stored in memory and the controller is programmed to maintain the battery SOC at or near the target. The actual battery SOC will of course fluctuate as the controller is programmed to selectively discharge and charge the battery when it is most efficient to do so. The vehicle 10 may include a battery-depletion mode in which the battery is discharged to drive the vehicle using the M/G 18, sometimes in conjunction with the engine 14. This mode is used when the battery SOC is high compared to a threshold SOC. The vehicle 10 may also include a battery-sustain mode in which the battery is charged and discharge to maintain the battery SOC near a target SOC. This mode is typically used once the battery is depleted to the battery SOC target. For example, the vehicle 10 may began a trip with a fully charged battery. The vehicle begins the trip in the battery-depletion mode and uses the battery for propulsion until the battery SOC reduces to a threshold SOC. Once the battery SOC drops to the threshold SOC, the controller switches to the battery-sustain mode and the battery SOC is charged/discharged to maintain a target SOC.

Pickup trucks are frequently used on constructions sites as well as at the home by contractors and individuals. Construction sites typically require electricity to power tools and the like. Available power sources, however, are often scarce. Therefore, mobile gas generators are commonly bought onto construction sites. These mobile generators are bulky, take-up storage space, and are difficult to move. Providing electrical power with a drivable vehicle overcomes many limitations of mobile gas generators. While vehicles are available with AC outlets, their 12-volt batteries have limited capacity as do their alternators. The vehicle 10, in contrast, has a large traction battery 20 and an M/G 18, which allows the vehicle to act as a mobile generator for powering auxiliary loads, such as power tools and buildings, for an extended period of time.

The vehicle 10 may be configured to power a variety of categories of external loads. In this field, loads have been classified into three categories including vehicle-to-load (V2L), vehicle-to-building (V2B), and vehicle-to-grid (V2G). V2L includes remote devices such as those commonly plugged into standard wall outlets. A non-exhaustive list of remote devices includes power tools, lights welders, pumps, vacuums, chargers, and the like. V2B includes houses, building, and the like. V2G refers to connecting the vehicle to the electrical power grid.

Figure 2:
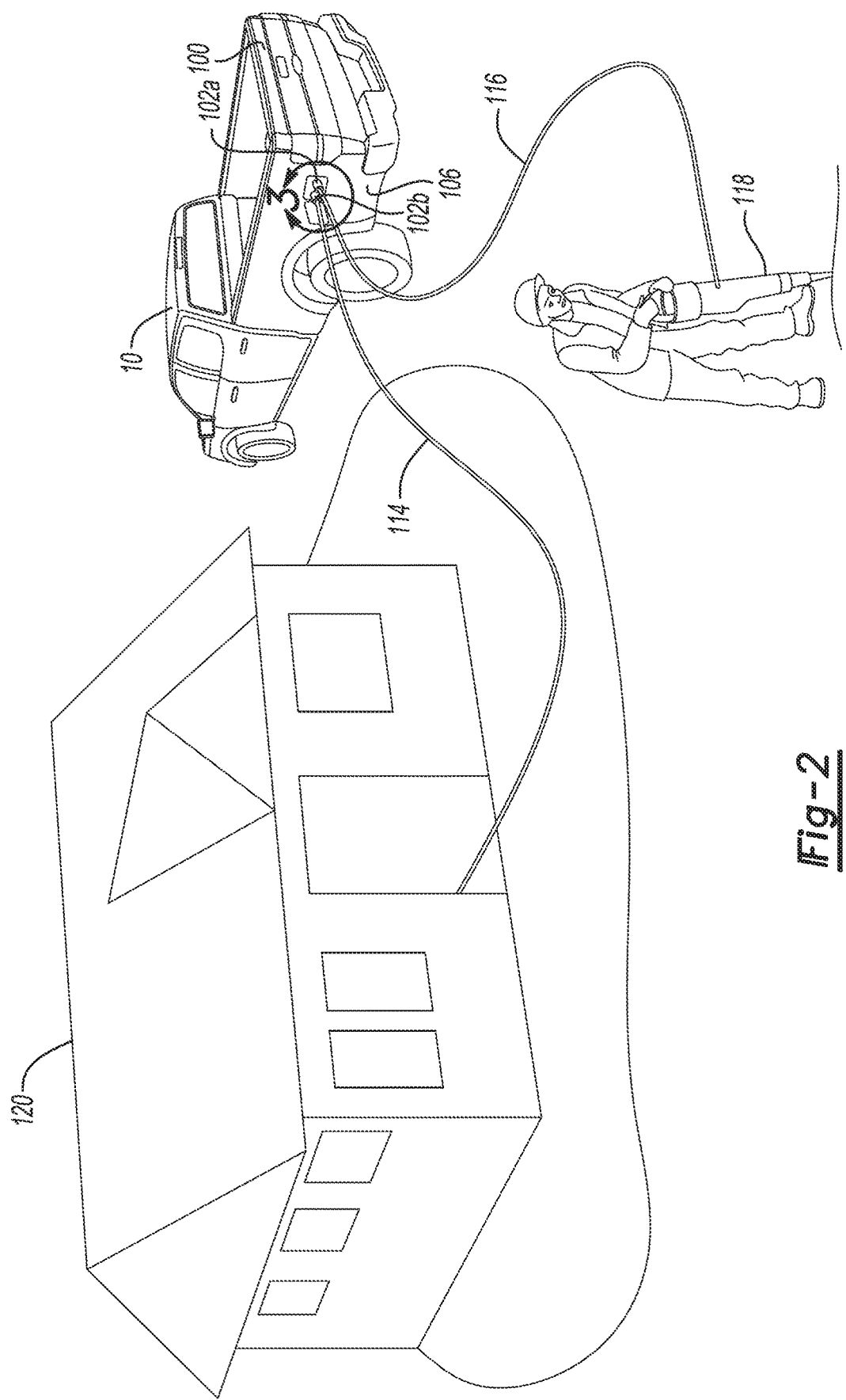
FIG. 2 is a schematic diagram of the hybrid vehicle powering loads with the auxiliary power system.

Referring to FIG. 2, the truck 10 includes an open cargo box 100 having a pair of opposing sidewalls 106 and a tailgate extending between the sidewall. The truck 10 has an auxiliary power system that includes one or more outlets configured to power electrical loads such as power tools. An electrical outlet 102 is disposed on the box 100. For example, the outlet 102 is mounted on an outer surface 104 of the sidewall 106. Alternatively, the outlet 102 may be mounted on the inner surface of the sidewall 106. The electrical outlet 102 may be one more outlets such as the two shown. Each electrical outlet may include a single electrical socket or multiple sockets. The sockets may have different voltage and current ratings so that different loads can be powered by the vehicle 10.

The electrical outlet(s) 102 is electrically connected to the auxiliary invertor 60. In the illustrated embodiment, the outlet 102 is configured to receive connectors, e.g., extension cords, to power external devices with the truck 10. For example, the truck 10 may power a building 121 using A V2B outlet 102b or a power tool 118 using A V2L outlet 102a. For illustrative purposes, FIG. 2 shows the vehicle 10 powering both the building 121 and the power tool 118 to highlight capabilities of the vehicle 10, but in practice, the vehicle may be configured to prevent powering V2L and V2B loads simultaneously. The bed outlet(s) 102 is merely an example and the bed outlet may include more or less sockets in other embodiments. Additional outlets may also be provided in other areas of the vehicle 10 such as in the passenger cabin. For example, an outlet may be provided on the front dash, in the front console, and/or in the rear console. The number and type of outlets and sockets may vary based on the power capability of the hybrid powertrain.

It may be advantageous to power the outlet 102 using battery power as opposed engine power. For example, the vehicle 10 may be operated as a mobile generator at night or in other circumstances in which it is desirable to reduce noise by powering with the traction battery 20. In other situations, emissions may be restricted requiring the traction battery 20 to power to the outlet 102. A typical traction battery 20 may include 1 to 150 kilowatt-hours (kWh) of energy, which typically allows the traction battery to provide hours operation depending on load. Thus, if the vehicle 10 arrives on site with a high battery state of charge (SOC), running the engine to power the outlet 102 may be avoided.

Generally, hybrid vehicles are programmed to selectively discharge the battery during transit to reduce the consumption of fuel. Operating in this baseline strategy, typically results in the battery being depleted during transit therefore limiting the ability to operate the outlet 102 using battery power alone. The vehicle 10, in addition to the base strategy, may include a battery-saver strategy in which the vehicle operates to maintain or charge the traction battery 20 during transit so that the battery 20 has a high SOC at the end of the trip. The vehicle may include both the battery-sustain mode and the battery-depletion mode in both the baseline strategy and the battery-saver strategy. The modes of the baseline strategy and the battery-saver strategy have different SOC targets/thresholds to encourage battery charging or discharging. In the baseline strategy the SOC targets/thresholds are lower to encourage battery discharge, and in the battery-saver strategy the SOC targets/thresholds are higher to encourage battery charge.

Figure 3:
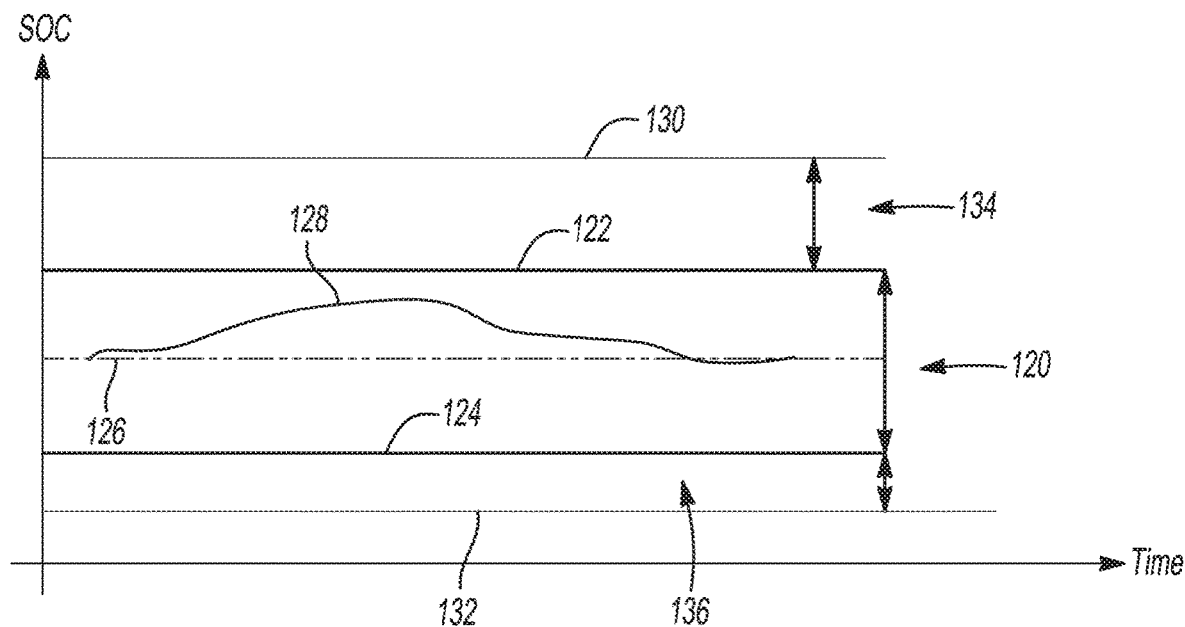
FIG. 3 is a plot illustrating battery state of charge parameters and actual state of charge of the battery during a baseline strategy.

Referring to FIG. 3, the controller 48 may a have a base operating window 120 for the battery SOC during the baseline strategy. The window 120 includes an upper limit 122, a lower limit 124, and a target state of charge (TSOC) 126. The TSOC 126 may be the median value of the window 120. In the illustrated example, the upper limit is 60% SOC, the lower limit is 40% SOC, and the TSOC is 50% SOC, but other values are contemplated. The TSOC 126 is a baseline SOC for the battery, but as shown in FIG. 3, the actual SOC 128 fluctuates above and below the TSOC 126 between the upper and lower limits 122, 124 based on operating conditions of the vehicle. (The SOC values here refer to permissible usable SOC, which is not necessarily the absolute limits of the battery. For example, a battery may never be charged to its physical 100% SOC nor fully discharged.)

The traction battery 20 may also have a maximum SOC 130 and a minimum SOC 132. An upper operating window 134 is defined between the maximum SOC 130 and the upper limit 122, and a lower operating window 136 defined between the minimum SOC 132 and the lower limit 124. In a limited set of conditions, the controller 48 allows the battery SOC to enter the upper and lower windows. For example, the controller 48 may allow the battery SOC to enter the lower window 136 in order to start the engine or enter the upper window 134 to pre-charge the traction battery 20.

Increasing or decreasing the TSOC 126 changes the balance of charging/discharging of the battery and can be manipulated to encourage battery charging or encourage battery depletion. Increasing the TSOC 126 is one way to achieve a higher battery SOC at the end of the trip so that the battery can be used to power the outlet 102.

Figure 4:
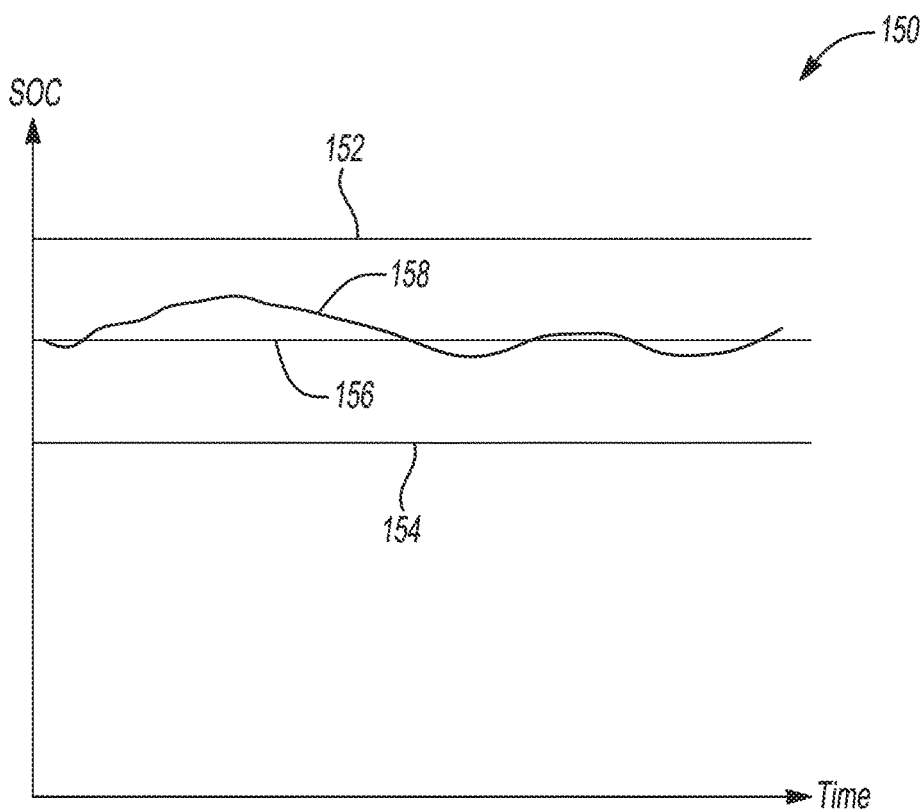
FIG. 4 is a plot illustrating battery state of charge parameters and actual state of charge of the battery during a battery-saver strategy.

FIG. 4 illustrates an operating window 150 for an example battery-saver strategy. The window 120 includes an upper limit 152, a lower limit 154, and a target state of charge (TSOC) 156. The TSOC 156 may be the median value of the window 150. In the illustrated example, the upper limit is 100% SOC, the lower limit is 80% SOC, and the TSOC is 90% SOC, but other values are contemplated. The TSOC 156 is a baseline SOC for the battery, but as shown in FIG. 4, the actual SOC 158 fluctuates above and below the TSOC 156 between the upper and lower limits 152, 154 based on operating conditions of the vehicle. In the battery-saver strategy, the upper limit 152 may be equal to the maximum SOC of the battery. According to one or more embodiments of the battery-saver strategy, the controller may be programmed to maintain the battery SOC above the TSOC 156 rather than allowing the SOC to fluctuate between the limits 152, 154 (some fluctuation will still be present through). For example, the controller may be programmed to command charging of the battery in response to the battery SOC being less than the TSOC 156.

Figure 5:
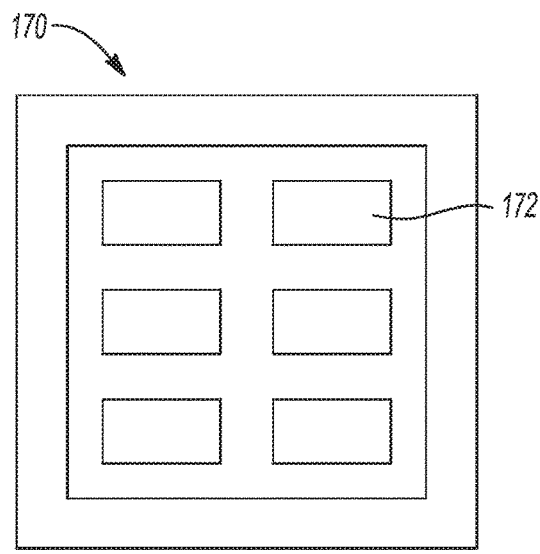
FIG. 5 is a schematic diagram a human-machine interface including a selectable option indicative of a user's desire to use the electrical outlet at a next destination.

Referring to FIG. 5, the vehicle 10 includes one or more human-machine interfaces (HMIs) such as touch screens, buttons, and the like. The vehicle 10 may include a main display 170 that includes an LCD screen with capacitive touch. The display 170 allows a user to operate various functionalities of the vehicle 10. The user can control operation of the onboard generator using the display 170. For example, the user can turn the outlet(s) 102 ON/OFF, monitor power consumption of the loads, monitor time remaining for both battery-alone and total system (battery plus engine), and others. The user may also be able to select an icon indicative of a user's desire to use the electrical outlet at a next destination. This icon 172 may be called "worksite prep" or any other name. Selecting the icon 172 results in the controller changing from the baseline charging strategy to the battery-saver strategy so that the battery 20 has a high SOC upon arrival at the destination.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 6:
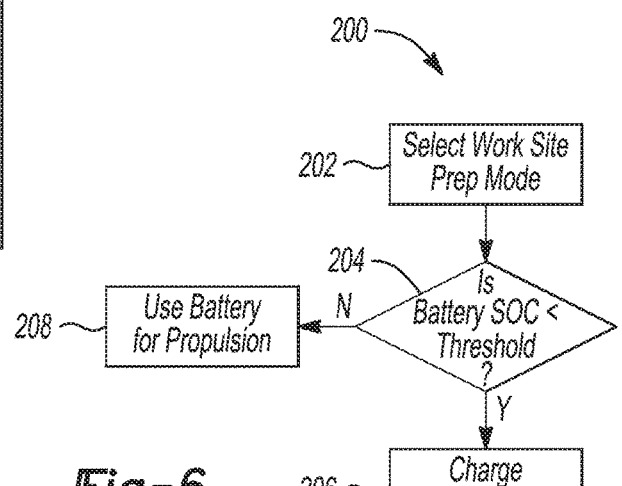
FIG. 6 is a flow chart of an algorithm for operating the battery during a battery-saver strategy.

FIG. 6 is a flowchart 200 of an algorithm for operating the vehicle once the icon 172 (or equivalent) has been selected by a user. The controls began at operation 202 once a selectable option indicative of a user's desire to use the electrical outlet at a next destination is selected, e.g., worksite preparation mode is selected. The selection of this option places the controls into a battery-saver strategy. At operation 204, the controller determines if the battery SOC is less than a threshold. The threshold may be between 75 and 100 percent. If the battery SOC is less than the threshold, control passes to operation 206 and the battery is charged, for example using the battery-sustain mode. If the battery SOC is greater than the threshold, control passes operation 200 and the traction battery is used for propulsion, for example using the battery-depletion mode. The controls 200 ensure that the battery SOC is maintained above a desired threshold during transit from the initial destination to the final destination so that the traction battery is sufficiently charged to power the outlets.

In one or more other embodiments, the vehicle may include GPS based controls for ensuring sufficient battery power at the end of the trip. For example, a user may save worksite locations into a navigation system of the vehicle. The user may enter addresses or like into the navigation system and tag these destinations as worksite locations. By tagging these destinations as worksite locations, the vehicle understands that the user intends to use the battery for powering the outlets at that location. The vehicle may calculate the distance to the destination and predict the battery SOC at the destination. The vehicle then optimizes the battery charging/discharging during the trip to ensure that the traction battery has a high battery SOC at the destination.

Figure 7:
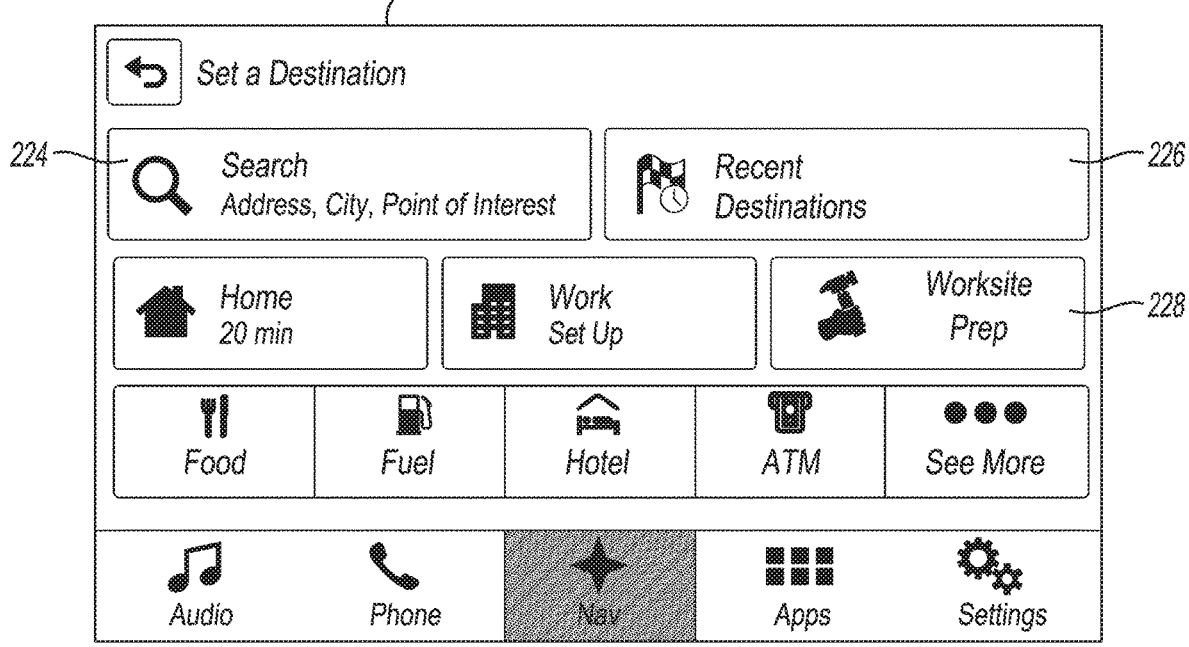
FIG. 7 is a schematic diagram a human-machine interface for a navigation system.'

Referring FIGS. 1 and 7, the vehicle 10 may include a navigation module 52 that provides routing information to the operator. The navigation module 52 may include a vehicle position sensor compatible with a Global Positioning System (GPS). The navigation module 52 may include a menu page 220 on a display 222 for displaying map and route information. The operator may input a destination via an input 224 or select a destination from memory via an input 226. The user may tag a destination as a worksite location using input 228. The navigation module 52 may output the vehicle position to other modules. The navigation module 52 may also output route information to other modules and the driver.

The vehicle 10 may include a wireless communications module 54 to communicate with devices and systems remote from the vehicle 10. The wireless communications module 54 may include an onboard modem having an antenna to communicate with off-board devices or systems. The wireless communications module 54 may be a cellular communications device to enable communications via a cellular data network. The wireless communications module 54 may be a wireless local area network (LAN) device compatible with IEEE 802.11 family of standards (i.e., WiFi) or a WiMax network. The wireless communications module 54 may include a vehicle based wireless router to allow connection to remote networks in range of a local router. The wireless communications module 54 may interface with one or more controllers in the vehicle 10 to provide data. The data received via the wireless communications module 54 may be utilized by the navigation module 52 in determining a route for the vehicle 10.

FIG. 8 is a flowchart 250 of an algorithm for operating the vehicle in a GPS-based worksite preparation mode. Control begins at operation 252 upon receipt of the navigation request tagged with worksite preparation. For example, a user may input an address via icon 224 and tag it as worksite preparation by pressing icon 228. At operation 254, the controller calculates the navigational route from the current vehicle location to the entered destination. At operation 256, the controller enables the battery-saver strategy to ensure that the traction battery is sufficiently charged at the destination to power the outlets. At operation 256, the controller may switch from the baseline target SOC to an increased target SOC, e.g. TSOC 126 to the TSOC 156. At operation 258, the controller calculates an estimated battery SOC at the destination. The estimated battery SOC may be based on the current battery SOC, the average battery consumption, and the trip distance. The average battery consumption indicates the average amount of battery power consumed per mile of travel. The average battery consumption is based on vehicle history similar to the average miles per gallon of fuel (MPG) calculation in conventional vehicles.

The controller determines if the estimated battery SOC will be less than the target SOC (operation 256) at the destination. If no, control passes operation 262 and the controller commands the charge-depletion mode to charge and maintain the battery at the target SOC. If yes, the controller commands the charge-sustain mode at operation 264. The controls 250 operate in a loop and the vehicle will remain in the charge-depletion mode or the charge-sustain mode until the answer of operation 260 changes. For example, the vehicle will remain in the charge-depletion mode until the estimated battery SOC is less than the target SOC, at which point, the controller commands the charge sustain mode.

Depending upon the equipment of the vehicle 10, the vehicle 10 may include the controls 200, the controls 250, or both. The above-described battery saver strategy allows the vehicle to arrive at the jobsite with a higher battery SOC and employing the baseline strategy so that the equipment loads on the outlets may be powered by the traction battery for a greater duration of time.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
an electric machine selectively coupled to the engine;
a traction battery;
a first power inverter configured to transfer power between the traction battery and the electric machine;
a second power inverter;
an electrical outlet, wherein the second power inverter is configured to transfer power between the traction battery and the electrical outlet;
a human-machine interface (HMI) including a selectable option indicative of a user's desire to use the electrical outlet at a next destination; and
a controller including a processor and memory having stored therein a first battery state of charge (SOC) target and a second battery SOC target that is greater than the first SOC target, the controller being programmed to, in response to the selectable option being selected, switch from the first SOC target to the second SOC target and command charging of the traction battery responsive to a measured battery SOC being less than the second target.

2. The vehicle of claim 1, wherein the second SOC target is greater than or equal to 80 percent.

3. The vehicle of claim 1, wherein the second SOC target is greater than or equal to 90 percent.

4. The vehicle of claim 1, wherein the electrical outlet is rated at least 100 volts.

5. The vehicle of claim 1, wherein the HMI is a touch-screen display and the selectable option is an icon selectable by capacitive touch.

6. The vehicle of claim 1, wherein the electrical outlet is located on a body panel of the vehicle.

7. A vehicle comprising:
an engine;
an electric machine selectively coupled to the engine;
a traction battery;
a first power inverter configured to transfer power between the traction battery and the electric machine;
an electrical outlet configured to power external loads when the vehicle is in generator mode;
a second power inverter configured to transfer power between the traction battery and the electrical outlet to power the external loads when in the generator mode;
a navigation system including a human-machine interface (HMI) configured to receive a destination input and a generator-mode input from a user; and
a controller including a processor and memory having stored therein a first battery state of charge (SOC) target and a second battery SOC target that is greater than the first SOC target, the controller being programmed to:
in response to receiving a destination via the destination input and receiving a request for generator mode via the generator-mode input, switch from the first SOC target to the second SOC target, and
in response to the vehicle having an estimated battery SOC at the destination being less than the second SOC target, charge the battery to the second SOC target.

8. The vehicle of claim 7, wherein the controller is further programmed to, in response to the vehicle having an estimated battery SOC at the destination greater than the second SOC target, propel the vehicle using power from the traction battery until the battery discharges to the second SOC target and then maintain the battery at the second SOC target.

9. The vehicle of claim 7, wherein the estimated battery SOC is based on a current battery SOC and a route distance between a current location of the vehicle and the destination.

10. The vehicle of claim 9, wherein the estimated battery SOC is based on an average battery consumption of the vehicle.

11. The vehicle of claim 10, wherein the average battery consumption is a measure of consumed power of the battery per mile of vehicle travel.

12. The vehicle of claim 7, wherein the second SOC target is greater than or equal to 80 percent.

13. The vehicle of claim 7, wherein the HMI is a touch-screen display and the destination input and the generator-mode input are icons selectable by capacitive touch.

14. The vehicle of claim 7, wherein the electrical outlet is rated at at least 100 volts.

15. A vehicle comprising:
an engine;
an electric machine selectively coupled to the engine;
a traction battery;
a first power inverter configured to transfer power between the traction battery and the electric machine;
an electrical outlet configured to power external loads when the vehicle is in generator mode;
a second power inverter configured to transfer power between the traction battery and the electrical outlet to power the external loads when in the generator mode;
a navigation system including a human-machine interface (HMI) configured to receive a destination input from a user and a generator-mode input from the user; and
a controller being programmed to:
calculate a navigational route between a current position of the vehicle and the destination,
calculate an estimated battery SOC at the destination,
in response to receiving the destination input and the generator-mode input, increase a state of charge (SOC) target for a first SOC target to a second SOC target, and
in response to the estimated battery SOC being less than the second SOC target, command a battery-sustain mode in which the battery is charged and maintained at the second SOC target.

16. The vehicle of claim 15, wherein the controller is further programmed to, in response to the estimated battery SOC being greater than the second SOC target, (i) command a battery-depletion mode, in which the battery is selectively discharged to propel the vehicle, until the battery SOC is discharged to the second SOC target, and (ii) then command the battery-sustain mode.

17. The vehicle of claim 15, wherein the estimated battery SOC is based on a current battery SOC and a route distance between a current location of the vehicle and the destination.

18. The vehicle of claim 17, wherein the estimated battery SOC is further based on an average battery consumption of the vehicle.

19. The vehicle of claim 15, wherein the second SOC target is greater than or equal to 80 percent.

20. The vehicle of claim 15, wherein the electrical outlet is rated at at least 100 volts.

* * * * *